United States Patent
Yamamura et al.

(10) Patent No.: US 10,312,544 B2
(45) Date of Patent: Jun. 4, 2019

(54) METHOD FOR MANUFACTURING ELECTRODE ACTIVE MATERIAL

(75) Inventors: Hideyuki Yamamura, Susono (JP); Seishu Komune, Shizuoka-ken (JP); Yasuaki Yamaguchi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 382 days.

(21) Appl. No.: 13/637,070

(22) PCT Filed: Mar. 26, 2010

(86) PCT No.: PCT/JP2010/055393
§ 371 (c)(1), (2), (4) Date: Nov. 15, 2012

(87) PCT Pub. No.: WO2011/118026
PCT Pub. Date: Sep. 29, 2011

(65) Prior Publication Data
US 2013/0059205 A1    Mar. 7, 2013

(51) Int. Cl.
| | |
|---|---|
| *H01M 10/052* | (2010.01) |
| *H01M 4/134* | (2010.01) |
| *H01M 4/485* | (2010.01) |
| *H01M 4/62* | (2006.01) |
| *H01M 4/36* | (2006.01) |

(52) U.S. Cl.
CPC ......... *H01M 10/052* (2013.01); *H01M 4/134* (2013.01); *H01M 4/366* (2013.01); *H01M 4/485* (2013.01); *H01M 4/625* (2013.01); *Y02T 10/7011* (2013.01)

(58) Field of Classification Search
CPC .... H01M 10/052; H01M 4/134; H01M 4/366; H01M 4/485; H01M 4/625
USPC ........................................ 429/231.8; 427/122
See application file for complete search history.

(56) References Cited

U.S. PATENT DOCUMENTS

| | | | |
|---|---|---|---|
| 2003/0129494 A1* | 7/2003 | Kaneda et al. | 429/231.1 |
| 2005/0136330 A1* | 6/2005 | Mao et al. | 429/231.95 |
| 2005/0233213 A1* | 10/2005 | Lee | H01M 4/13 429/218.1 |
| 2005/0247914 A1* | 11/2005 | Mao et al. | 252/500 |
| 2006/0068287 A1* | 3/2006 | Morita et al. | 429/223 |
| 2007/0231671 A1* | 10/2007 | Inasaki | H01B 1/122 429/483 |
| 2011/0091771 A1* | 4/2011 | Sannan | C09D 5/002 429/217 |
| 2015/0087586 A1* | 3/2015 | Barrack | A61K 47/48284 514/6.5 |

FOREIGN PATENT DOCUMENTS

| | | |
|---|---|---|
| CN | 101442124 | 5/2009 |
| JP | 11-86865 | 3/1999 |
| JP | 11-185752 | 7/1999 |
| JP | 2000-90916 | 3/2000 |
| JP | 2002-42806 | 2/2002 |
| JP | 2006-92969 | 4/2006 |
| JP | 2007-214137 | 8/2007 |
| JP | 2008-210618 | 9/2008 |
| JP | 2008-311067 | 12/2008 |
| JP | 2010-165610 | 7/2010 |

OTHER PUBLICATIONS

The American Heritage© Dictionary of the English Language, 4th edition Copyright © 2006 by Houghton Mifflin Harcourt Publishing Company. Published by Houghton Mifflin Harcourt Publishing Company. All rights reserved. Definitions of calcine, reflux, and distillation.*

J. Kim et al., "Enhanced Cycle Performance of SiO—C Composite Anode for Lithium-ion Batteries," Journal of Power Sources, vol. 170, pp. 456-459 (2007).

* cited by examiner

*Primary Examiner* — Miriam Stagg
*Assistant Examiner* — Claire L Roe
(74) *Attorney, Agent, or Firm* — Finnegan, Henderson, Farabow, Garrett & Dunner, LLP

(57) ABSTRACT

The method for manufacturing a particulate electrode active material provided by the present invention uses a carbon source supply material prepared by dissolving a carbon source (102) for forming a carbon coating film in a predetermined first solvent, and an electrode active material supply material prepared by dispersing a particulate electrode active material (104) in a second solvent that is compatible with the first solvent and is a poor solvent with respect to the carbon source. The carbon source supply material and the electrode active material supply material are mixed and a mixture of the electrode active material and the carbon source obtained after the mixing is calcined, thereby forming a conductive carbon film derived from the carbon source on the surface of the electrode active material.

6 Claims, 8 Drawing Sheets

METHOD FOR MANUFACTURING ELECTRODE ACTIVE MATERIAL

CROSS-REFERENCE TO RELATED APPLICATIONS

This application is a national phase application of International Application No. PCT/JP2010/055393, filed Mar. 26, 2010, the content of which is incorporated herein by reference.

TECHNICAL FIELD

The present invention relates to a method for manufacturing an electrode active material for use in a lithium secondary battery or other battery. The present invention also relates to an electrode active material manufactured by the aforementioned method and the use thereof.

BACKGROUND ART

The importance of secondary batteries such as lithium secondary batteries (typically, lithium ion batteries) and nickel hydride batteries as power supplies for vehicles or power supplies for personal computers and portable terminals has grown in recent years. In particular, lithium secondary batteries that make it possible to obtain a high energy density with a light weight are expected to be advantageously used as high-output power supplies for vehicles.

The increased battery capacity is one of the characteristics that are required for secondary batteries to be used as high-output power supplies for vehicles. The use of substances that can realize a capacitance higher than that of the conventional devices as electrode active materials has been investigated as a means for fulfilling such a requirement. For example, metal compound (typically, metal oxide) materials that use Si, Ge, Sn, Pb, Al, Ga, In, As, Sb, Bi, or the like as the constituent metal elements (including semi-metallic elements; same hereinbelow) can be used in lithium secondary batteries as electrode active materials (more specifically, negative electrode active materials) that reversibly absorb and desorb lithium ions, and such materials are known to have a capacitance higher than that of the graphite materials that have been conventionally used as negative electrode active materials. Therefore, it can be expected that by using such metal compounds (typically, metal oxides) as electrode active materials, it would be possible to realize an increased capacitance of lithium secondary batteries.

However, metal compound materials (for example, metal oxide materials such as silicon oxide ($SiO_x$)) using the aforementioned elements as the constituent elements typically have a low electric conductivity. Therefore, when such metal oxides are used as electrode active materials, it is necessary to form a conductive coating film, more specifically a coating film made of conductive carbon, on the surface of electrode active material particles made of the metal oxide, thereby ensuring conductive routes (paths) through which lithium ions or electrons can move between the electrode active material particles and between the electrode active material particles and the electrolyte solution or electrode collector.

Examples of the conventional techniques relating to such electrode active materials are disclosed in the following Patent Literature 1 to 3. Patent Literature 1 describes an electrode active material in which the surface of particles made of Si, SiO and $SiO_2$, and a carbonaceous material is coated with carbon. Patent Literature 2 describes various particulate metal compounds coated with a carbonaceous material as compounds that can be used as a negative electrode active material for a nonaqueous lithium secondary battery. Further, Patent Literature 3 describes a negative electrode active material for a lithium secondary battery that is formed of metal complex oxide particles including an amorphous structure and a method for manufacturing such a negative electrode active material.

CITATION LIST

Patent Literature

Patent Literature 1: Japanese Patent Application Publication No. 2006-092969
Patent Literature 2: Japanese Patent Application Publication No. 2000-090916
Patent Literature 3: Japanese Patent Application Publication No. 1111-185752

However, with the conventional techniques such as described in the abovementioned patent literature, it is difficult to form a sufficient carbon coating film on the particles of the above-described metal compounds (for example, silicon oxide $SiO_x$). Thus, metal compound particles (primary particles) of this type readily aggregate in a solvent such as water and eventually the carbonaceous material for forming the carbon coating film is attached only to the surface of secondary particles formed by the primary particles that have grown together and aggregated. In such a state, portions where the carbon coating film has not been formed are present at a rather large ratio on the surface of primary particles constituting the secondary particles. As a result, an electrode active material (secondary particles) including a substance (portions) that is inactive with respect to lithium ions is produced, which is undesirable from the standpoint of increasing the battery capacitance.

SUMMARY OF INVENTION

The present invention has been created to resolve this problem and it is an object thereof to provide a method capable of forming efficiently a carbon coating film on metal compound particles (primary particles) such as $SiO_x$ that can become an electrode active material realizing an increased battery capacitance. Another object of the present invention is to provide a method for manufacturing an electrode active material in which the desirable carbon coating film is formed by implementing the aforementioned method for forming the carbon coating film. Yet another object of the present invention is to provide a lithium secondary battery and other battery realizing an increased capacitance that is provided with the electrode active material (more specifically, a negative electrode active material and/or a positive electrode active material) manufactured by the aforementioned manufacturing method.

The present invention provides a method for manufacturing an electrode active material of the following embodiments.

Thus, one of the manufacturing methods disclosed herein is a method for manufacturing a particulate electrode active material having a surface covered with a conductive carbon coating film. This method includes:

(1) preparing a carbon source supply material prepared by dissolving a carbon source for forming the carbon coating film in a predetermined first solvent in which the particulate electrode active material, which is the object of coating, can be dispersed;

(2) preparing an electrode active material supply material prepared by dispersing the particulate electrode active material, which is the object of coating, in a second solvent that is compatible with the first solvent, that allows the particulate electrode active material to be dispersed therein, and that is a poor solvent with respect to the carbon source;

(3) preparing a mixed material in which the prepared carbon source supply material and electrode active material supply material are mixed; and (4) forming a conductive carbon coating film derived from the carbon source on a surface of the electrode active material by calcining a mixture of the electrode active material and the carbon source obtained after the mixing.

The specific feature of the manufacturing method of the abovementioned configuration is that the carbon source supply material prepared by dissolving the carbon source for forming a carbon coating film in the first solvent is mixed with the electrode active material supply material prepared by dispersing in a solvent that is different from the first solvent and is a poor solvent with respect to the carbon source (that is, a solvent with a relatively low solubility of the carbon source, typically a poor solvent in which the solubility of the carbon source is equal to or less than $1/10$, preferably equal to or less than $1/100$ that in the first solvent, when the solubility is compared at the same temperature (for example, in a room temperature range of 20 to 30° C.)).

In a mixed solvent in which the first solvent and the second solvent produced by mixing the aforementioned two materials are present in a mixture (mutually dissolved), the carbon source is present substantially only in the first solvent component and is unlikely to be present in the second solvent (poor solvent) component. Meanwhile, the particulate electrode active material can flow and be dispersed in either of the first and second solvents. In other words, when the dispersed electrode active material particles that freely move between the first and second solvent components in the abovementioned mixed solvent are present in the first solvent component, the electrode active material particles interact with the carbon source present in this solvent. Typically, the carbon source is bonded or adheres to the surface of the electrode active material particles. The movement of the electrode active material particles (typically, the electrode active material particles having the carbon source bonded or adhered to the surface thereof) that have interacted with the carbon source from the first solvent to the second solvent is controlled by the presence of the carbon source that has interacted therewith. Therefore, in the mixed solvent in which the abovementioned first solvent component and second solvent component are present in a mixture, the carbon source can be efficiently caused to interact with (to adhere or be bonded to) the dispersed electrode active material particles and excessive aggregation of the electrode active material particles with each other is inhibited. Therefore, with the manufacturing method of the present configuration, a particulate electrode active material in which a carbon coating film is effectively formed (that is, the portions where the coating film has not been formed are small) on the surface of primary particles can be manufactured by calcining the electrode active material particles together with the carbon source in the effective dispersed state in which the excessive aggregation of the electrode active material particles is inhibited.

Examples of the particulate electrode active material that is the object of coating with the carbon coating film and can be advantageously used in the method for manufacturing an electrode active material disclosed herein include metal oxides using Si, Ge, Sn, Pb, Al, Ga, In, As, Sb, Bi, or the like as the constituent metal elements and other metal compounds (preferably, metal compounds having any of the aforementioned metals as the constituent metal element and further having a hydroxyl group on the surface thereof). By using those metal compounds as negative electrode active materials of lithium secondary batteries, it is possible to provide lithium secondary batteries that demonstrate a capacitance higher than that of the conventional lithium ion batteries using graphite as the negative electrode active material.

In a preferred embodiment of the manufacturing method disclosed herein, the electrode active material is mainly formed of a silicon oxide represented by a general formula $SiO_x$ (x in the formula is a real number satisfying the condition $0<x<2$). The silicon oxide of this kind has a high theoretic capacitance relating to absorption and desorption of lithium ions and can be advantageously used, for example, as a negative electrode active material of a lithium secondary battery.

The electrode active material formed of the abovementioned silicon oxide or a compound (typically, a metal oxide) of another of the above-described metal species expands or contracts following the absorption or desorption of lithium ions during charging and discharging, and the volume thereof changes significantly. In this case, in the active material in which a carbon coating film is formed only on the surface of secondary particles (that is, aggregates of primary particles), as described hereinabove, the secondary particles are broken by stresses caused the abovementioned expansion and contraction. As a result, a granular material is produced that has a surface where the carbon coating film is not formed. The abovementioned silicon oxide or other metal compound on which the carbon coating film is not formed does not have conductive paths created by the carbon coating film and makes no contribution as an electrode active material to the battery capacitance. Another undesirable result is that battery durability, in particular cyclic characteristic, is degraded.

By contrast, with the manufacturing method disclosed herein, a carbon coating film can be efficiently formed on the surface of primary particles. Therefore, even though the active material expands or contracts following the absorption and desorption of lithium ions and the volume thereof changes significantly, a granular matter (crushed secondary particles) having the surface where the carbon coating film has not been formed is unlikely to appear. Therefore, it is possible to provide an electrode active material with a carbon coating film that is suitable for constructing a battery that maintains a high capacitance with good stability and also excels in a cycle characteristic.

In another preferred embodiment of the method for manufacturing an electrode active material disclosed herein, the carbon source is a water-soluble compound, the first solvent is an aqueous solvent (typically, water), and the second solvent is a nonaqueous solvent that is compatible with water. It is especially preferred that a polar solvent such as ethanol be used as the abovementioned nonaqueous solvent (second solvent). Further, a water-soluble polymer (typically a polymer having a polar group such as a hydroxyl group in a molecular chain) such as polyvinyl alcohol is an advantageous example of the water-soluble compound.

By using the first solvent and the second solvent in such a combination, it is possible to manufacture a particulate electrode active material in which the carbon coating film is formed more effectively on the surface of primary particles.

In yet another preferred embodiment of the method for manufacturing an electrode active material disclosed herein, the mixed material is subjected to reflux processing before the calcining.

By performing the reflux processing (typically, the reflux processing is performed in a temperature range in which the solvent of the mixed material can be boiled) with respect to the mixed material after the abovementioned mixing and before the calcining, it is possible to disperse the particulate electrode active material more advantageously in the mixed material. Therefore, the carbon coating film can be formed more efficiently on the surface of the electrode active material.

Yet another preferred embodiment of the method for manufacturing an electrode active material disclosed herein further includes adding the mixed material before the calcining to a third solvent that is a solvent different from the second solvent, allows the particulate electrode active material to be dispersed therein, and is a poor solvent with respect to the carbon source. A mixture of the electrode active material and the carbon source after the addition to the third solvent is calcined.

When the mixed material is added to the third solvent, the carbon source present in the mixed material is not dissolved in the third solvent. Therefore, the mixture of the electrode active material and carbon source added to the third solvent (typically, the electrode active material having the carbon source adhered or bonded to the surface thereof) forms associations of a predetermined size in the third solvent and typically precipitates in the solvent. With the manufacturing method of the present embodiment, the mixed material of the electrode active material and carbon source can be calcined in a state in which the aforementioned associations have been formed.

Therefore, with the manufacturing method of such an embodiment, the size (particle diameter) of secondary particles of the electrode active material, which are coated with the carbon coating film, after the calcining can be controlled according to the size of the associations that are formed. Thus, typically, it is possible to manufacture a particulate electrode active material (secondary particles) that has the carbon coating film formed on the surface thereof (preferably, of a substantially uniform particle size) and has a small particle size distribution, without performing pulverization after the calcination.

For example, when the first solvent is an aqueous solvent and the carbon source is a water-soluble compound, it is preferred that an organic solvent which is compatible with the aqueous solvent and in which the water-soluble compound is unlike to dissolve be used as the third solvent.

The present invention also provides a lithium secondary battery in which the electrode active material disclosed herein (typically, the negative electrode active material formed of the metal compound manufactured by any of the manufacturing methods disclosed herein) is included in a positive electrode or a negative electrode.

Because the lithium secondary battery disclosed herein is provided with the abovementioned electrode active material, an increased capacitance and good electric conductivity can be realized. Therefore, such a battery demonstrates performance particularly suitable for a battery to be installed on a vehicle that requires high-rate charging and discharging.

Therefore, in accordance with the present invention, a vehicle is also provided that includes the lithium secondary battery disclosed herein. In particular, a vehicle (for example, an automobile) is provided that includes the lithium secondary battery as a power supply (typically a power supply of a hybrid vehicle or an electric automobile).

DESCRIPTION OF EMBODIMENTS

Figure 1:
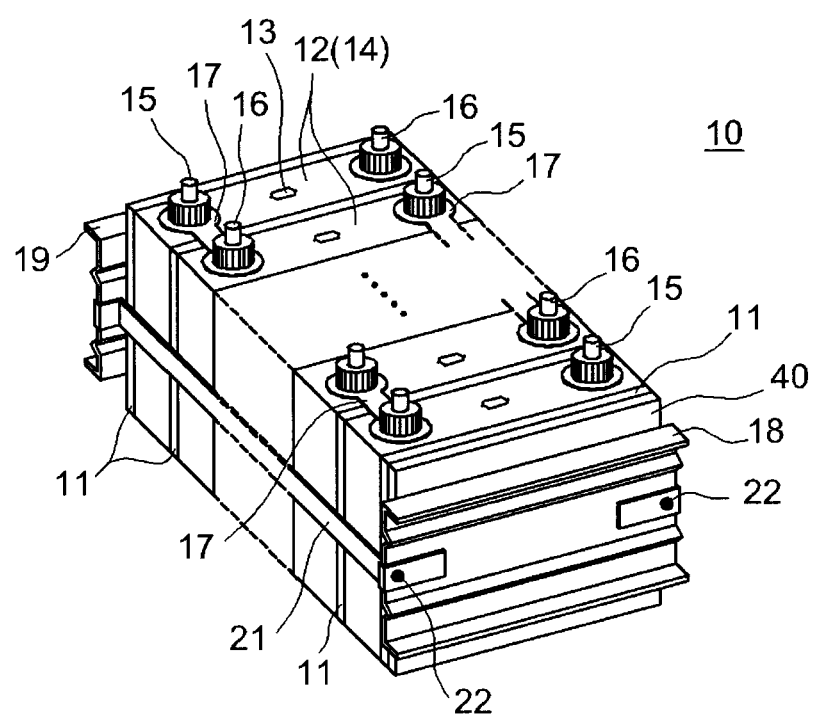
FIG. 1 is a perspective view illustrating schematically a battery assembly according to an embodiment of the present invention.

Preferred embodiments of the present invention are explained below. Any features other than the features specifically set forth in the present description and which may be necessary for carrying out the present invention can be regarded as design matters for a person skilled in the art, those matters being based on the conventional techniques in the pertinent technical field. The present invention can be carried out on the basis of the disclosure of the present description and common technical knowledge in the pertinent technical field.

In the present description, the "electrode active material" is a term inclusive of a positive electrode active material that is used at a positive electrode side and a negative electrode active material that is used at a negative electrode side. The active material as referred to herein is a substance (compound) participating in accumulation of electric charges at the positive electrode side or negative electrode side. Thus, the active material is a substance taking part in release and intake of electrons when a battery is charged and discharged.

Further, in the present description, the "lithium secondary battery" is a battery in which transfer of electric charges is performed by lithium ions in an electrolyte. The so-called lithium ion battery (or lithium ion secondary battery) and the battery called lithium polymer battery are typical examples of batteries covered by the "lithium secondary battery" term used herein.

With the manufacturing method disclosed herein, it is possible to manufacture a particulate electrode active material in which, as mentioned hereinabove, a conductive carbon coating film is formed on the surface.

The manufacturing method disclosed herein makes it possible to cover efficiently the surface of electrode active material particles (that is, primary particles) that have a low electric conductivity with a conductive carbon coating film.

An active material that can be dispersed at least in the abovementioned first solvent and second solvent and can be made suitable for forming a conductive carbon coating film derived from a carbon source on the surface thereof by calcining may be used as the particulate electrode active material that is the object of performing the aforementioned coating. For example, various metal compounds (for example, metal oxides) advantageous as negative electrode active materials for lithium secondary batteries, for example, metal oxides having Si, Ge, Sn, Pb, Al, Ga, In, As, Sb, and Bi as constituent metal elements and other metal compounds (preferably, metal compounds containing any of the aforementioned metal elements as a constituent metal element and having a hydroxyl group on the surface thereof) can be used. In particular, a silicon oxide such as specified by the abovementioned formula can be advantageously used. Furthermore, various lithium-transition metal complex oxides (for example, $LiCoO_2$, $LiNiO_2$, and $LiMn_2O_4$) that can be used as positive electrode active materials of lithium ion secondary batteries can be used.

For example, a polyanion compound represented by a general formula $LiMAO_4$ can be used. M in this formula is typically one, or two or more elements (typically one, or two or more metal elements) including at least one metal elements selected from the group consisting of Fe, Co, Ni, and Mn. Thus, at least one metal element selected from the group consisting of Fe, Co, Ni, and Mn is included, but the presence of a minor additional element that can be contained in a small amount is also allowed (such minor additional element may be absent). Further, in the abovementioned formula, A is typically one, or two or more elements selected from the group consisting of P, Si, S, and V.

Typically, a particulate electrode active material with an average particle size (for example, a median diameter: d50 determined by a light scattering method or an average particle size determined by microscopic observations) of about 10 nm to 10 μm (typically, 100 nm to 5 μm, for example, from 100 nm to about 1000 nm) can be preferably used.

A particularly advantageous specific example of the electrode active material is a silicon oxide represented by the general formula $SiO_x$. In this formula, x is typically a real number satisfying the condition of $0<x<2$, and preferably can be about $0<x<0.6$. A particulate material formed of a commercially available silicon oxide such as SiO can be advantageously used.

By using such silicon oxide as a negative electrode active material, it is possible to obtain a lithium secondary battery that has a particularly high charge-discharge capacitance. Further, with the negative electrode active material for a lithium secondary battery formed of such a metal oxide, the active material expands by itself when lithium ions are absorbed during charging and discharging and, conversely, the active material contracts by itself when the lithium ions are released. Therefore, structural changes of the negative electrode active material structure (that is, a layered configuration formed on the surface of the negative electrode collector, typically from copper, by secondary particles obtained by aggregation of primary particles) present in the negative electrode of the battery can easily occur, and a conductive carbon coating film should be formed in advance to a sufficient extent on the surface of the primary particles constituting the aforementioned negative electrode active material structure in order to maintain a high electric conductivity in the negative electrode active material structure after such structural changes. By implementing the manufacturing method disclosed herein, it is possible to form efficiently a sufficient conductive carbon coating film on the surface of primary particles of the electrode active material having such properties.

In the usual state, H groups (typically Si—O—H or Si—H) are often present on the surface of particles of silicon oxide such as silica. Because of the presence of such H groups (H atoms), for example, when a water-soluble compound is used as a carbon source, hydrogen bonds, covalent bonds, or the like can be generated between the H groups of silicon oxide particles and highly electronegative portions (for example, portions of —OH groups) present in the compound, and strong interaction can occur. Therefore, by selecting the appropriate first solvent and second solvent, it is possible to attach easily the carbon source such as a water-soluble compound to the surface of silicon oxide particles.

A compound that can be thermally decomposed when calcined together with the electrode active material particles, thereby forming a conductive carbon coating film (carbon structure), and can be dissolved at least in an appropriate solvent can be used as the carbon source for forming a conductive carbon coating film on the surface of the electrode active material particles constituting a metal compound such as the abovementioned silicon oxide.

For example, a water-soluble organic compound (in particular, a polymer compound such as a water-soluble polymer) that has poor solubility in a predetermined organic solvent (that is, this organic solvent corresponds to a poor solvent) can be advantageously used.

The preferred examples of such organic compounds include water-soluble polymer compounds (polymers) such as polyvinyl alcohol (PVA). PVA has a large number of hydroxyl groups (—OH) in a molecular chain, and because of the presence of the hydroxyl groups, the desirable interaction (for example, chemical bonding such as hydrogen bonding, covalent bonding, and ion bonding, and physical bonding such as adsorption) easily occur with electrode active material particles. Another merit of polyvinyl alcohol is that thermal decomposition thereof under oxidizing conditions in the air can result in the formation of a carbon coating film demonstrating good electric conductivity. Examples of water-soluble polymer compounds, other than PVA, that can be used as the carbon source include cellulose derivatives such as starch, gelatin, methyl cellulose, and carboxymethyl cellulose, polyacrylic acid, polyacrylamide, polyethylene oxide, and polyethylene glycol.

The preferred embodiment of the manufacturing method disposed herein in which the particulate electrode active material and carbon source (material for forming a carbon coating film) such as described hereinabove are used will be explained hereinbelow.

The carbon source supply material that is used in the manufacturing method disclosed herein is prepared by dissolving a predetermined carbon source (only carbon source of one type may be used or a combination of carbon sources of two or more types may be used) is dissolved in an appropriate amount in a first solvent capable of dissolving the carbon source material. For the sake of convenience, the first solvent (solvent for preparing the carbon source supply material) will be referred to as the first solvent. The first solvent may be formed of an individual substance (molecular species) or by a mixed medium of a plurality of substances (molecular species). The first solvent can be selected according to the carbon source to be used. For example, when a water-soluble organic substance such as PVA is used as the carbon source, an aqueous solvent capable of advantageously dissolving such a compound is preferred. Typically, water (inclusive of distilled water and deionized water) can be used as the first solvent.

The concentration of the carbon source in the carbon source supply material (that is, the carbon source solution) is not particularly limited, but the content that can be entirely dissolved (the concentration lower than that of the saturated solution obtained with the solvent) is preferred. For example, in the case of a water-soluble compound such as PVA, an aqueous solution such that the concentration of the water-soluble compound is about 0.1 to 20 wt % (preferably about 0.3 to 15 wt %), where the total carbon source supply material is taken as 100 wt %, can be advantageously used (however, the aforementioned numbers are not limiting). For example, an aqueous PVA solution prepared by adding about 1 g to 10 g of PVA to 1 liter (L) of water is an advantageous example of the carbon source supply material. When the carbon source supply material is prepared, various stirring and mixing means can be used to dissolve completely the carbon source. For example, stirring by vibrations caused by ultrasound can be performed or a magnetic stirrer can be used.

The carbon source supply material may also include components other than the above-described first solvent and carbon source, provided that the object of the present invention is still attained. Examples of suitable additional components include a pH adjusting agent, a surfactant, a preservative, and a colorant.

Meanwhile, the particulate electrode active material supply material that is used in the manufacturing method disclosed herein is prepared by dispersing an appropriate amount of a predetermined particulate electrode active material in a second solvent capable of dispersing the particulate electrode active material. Similarly to the first solvent, for the sake of convenience, the aforementioned second solvent will be referred to as the second solvent. The second solvent may be formed of an individual substance (molecular species) or by a mixed medium of a plurality of substances (molecular species).

In addition to the capability of dispersing the particulate electrode active material that is to be used, the second solvent is required to be compatible with the first solvent and be a poor solvent with respect to the carbon source to be used. For example, when a water-soluble organic substance (typically, a water-soluble polymer) such as PVA, polyacrylic acid, and polyethylene glycol is dissolved in water as the first solvent and the solution obtained is used as the carbon source supply material, an organic solvent that is compatible with water and is unlikely to dissolve the carbon source (the solubility of the carbon source is extremely low) can be advantageously used as the second solvent. For example, alcohols that are poor solvents with respect to PVA, for example, lower alcohols with a number of carbon atoms equal to or less than five, such as methanol, ethanol, isopropanol, and butanol (typically, 2-methyl-2-butanol) can be used as the second solvent. Thus, it is obvious to a person skilled in the art that where the carbon source to be used is determined, any solvent that is well known to be a poor solvent with respect to the determined carbon source may be selected as appropriate.

Further, the concentration of the electrode active material in the electrode active material supply material (that is, a dispersion or suspension including the active material source in a dispersed state) is not particularly limited. For example, in the case of silicon oxide such as SiO or another metal oxide described hereinabove, a dispersion with a content ratio of the particulate electrode active material of about 0.5 to 20 wt % (preferably about 1 to 10 wt %), where the total electrode active material supply material is taken as 100 wt %, can be advantageously used as the electrode active material supply material. For example, a dispersion (or suspension) prepared by adding about 10 g to 100 g of silicon oxide to 1 liter (L) of a lower alcohol with a number of carbon atoms equal to or less than five, such as ethanol, is an advantageous example of the electrode active material supply material.

The electrode active material supply material may also include components other than the above-described second solvent and particulate electrode active material, provided that the object of the present invention is still attained. Examples of suitable additional components include a conductivity enhancing material typically formed of a carbon material such as carbon black, a dispersant, a pH adjusting agent, a surfactant, a preservative, and a colorant. For example, it is preferred that a conductivity enhancing material (for example, a finely powdered conductive carbon material such as carbon black) be added in an amount corresponding to 1 to 20 wt % of the total amount of the electrode active material formed of silicon oxide such as SiO or another metal compound (oxide or the like) described hereinabove.

In the manufacturing method disclosed herein, a mixed material is prepared by mixing at a predetermined ratio the carbon source supply material and electrode active material supply material prepared in the above-described manner. In this case, since the second solvent (derived from the electrode active material supply material) is a poor solvent with respect to the carbon source included in the carbon source supply material, the carbon source (typically, an organic substance) is unlikely to be present in the second solvent (poor solvent) component and is present substantially only in the first solvent component. Meanwhile, the particulate electrode active material can flow in both the first solvent and the second solvent. Therefore, when the dispersed electrode active material particles that can freely move between the first and second solvent components in the mixed solvent are present in the first solvent component, those particles interact with the carbon source present in this solvent. For example, when the carbon source is a compound having a polar group (for example, PVA having a large number of hydroxyl groups in a molecular chain) and the particulate electrode active material is provided with a polar group (for example, a hydrogen atom present on the surface of SiO) on the surface, the desirable interaction with the electrode active material particles (for example, chemical bonding such as hydrogen bonding, covalent bonding, and ion bonding, or physical bonding such as adsorption) easily occurs due to the presence of such hydroxyl groups.

Figure 5:
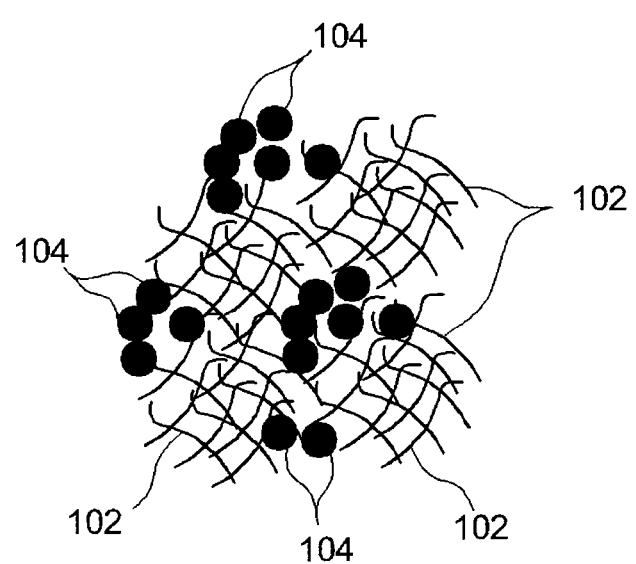
FIG. 5 is an explanatory drawing illustrating schematically the state (aggregation state of electrode active material particles) in which a carbon source and a particulate electrode active material are together added to the conventional single solvent.
Figure 6:
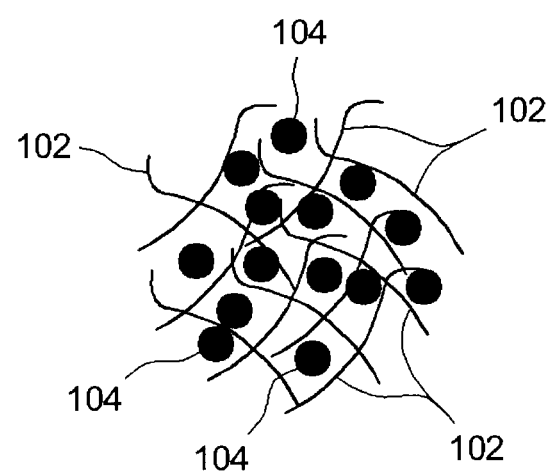
FIG. 6 is an explanatory drawing illustrating schematically the presence state of the carbon source and particulate electrode active material in a mixed material (material prepared by mixing the first solvent and the second solvent) obtained by the manufacturing method disclosed herein.

FIG. 5 is a schematic diagram illustrating the state obtained by adding a carbon source (for example, PVA) 102 together with a particulate electrode active material (for example, silicon oxide) 104 to the conventional single solvent (for example, water) and mixing. As shown in the diagram, where an individual solvent (for example, good solvent with respect to the carbon source) is used, excessive aggregation of electrode active material particles in this solvent can occur which is undesirable for the above-described reasons. By contrast, when a method is used by which the carbon source supply material and electrode active material supply material are mixed by appropriate amounts by using the first solvent and the second solvent, as shown in FIG. 6, the carbon source 102 is present substantially only in the first solvent component. As a result, the presence distribution of the particulate electrode active material 104 is controlled according to the presence distribution of the carbon source 102 in the mixed material, aggregation such as shown in FIG. 5 is inhibited, and the advantageous dispersed state of the electrode active material (primary particles) 104 can be realized.

The mixing mass ratio of the carbon source supply material and electrode active material supply material can differ depending on the concentration of the carbon source and/or the content ratio of active material particles in the supply materials and, therefore, is not particularly limited As a guideline, it is preferred that the two supply materials be mixed so that a sufficient amount of the carbon source be attached to the surface of the electrode active material. For example, it is preferred that the mixing ratio of the carbon source supply material and electrode active material supply material be prepared such that the carbon source (for example, PVA) be mixed in an amount of about 0.1 to 15 parts by weight per 1 part by weight of the particulate electrode active material (for example, silicon oxide). It is more preferred that the carbon source (for example, PVA) be mixed in an amount of about 0.1 to 10 parts by weight per 1 part by weight of the particulate electrode active material (for example, silicon oxide), and it is even more preferred that the mixed material be prepared by mixing the above-mentioned carbon source supply material and electrode active material supply material so that the carbon source (for example, PVA) be mixed in an amount of about 1 to 5 parts by weight per 1 part by weight of the particulate electrode active material (for example, silicon oxide). Where the carbon source and the particulate electrode active material are mixed at such a mixing ratio, the appropriate amount of the carbon source can be attached to the surface of the electrode active material. Further, as described hereinbelow, the effective associations can be formed when the mixed material is added to a third solvent. Thus, where the mixing ratio of the carbon source is too low, the associations are unlikely to be formed. Meanwhile, where the mixing ratio of the carbon source is too high, undesirable associations constituted only by the carbon source can be formed.

As another indication, it is preferred that the two supply materials be mixed so as to prevent the particulate electrode active material from excessive aggregation. From this standpoint, it is desirable that the mixing volume ratio of the second solvent (for example, a polar organic solvent such as ethanol and other lower alcohols that allows the electrode active material particles such as $SiO_x$ to be dispersed therein), which is a poor solvent for the carbon source, be substantially equal to the mixing volume ratio of the first solvent (for example, water capable of dissolving the carbon source such as PVA), that is, that the two solvents be mixed in substantially equal volumes. For example, the appropriate mixing volume ratio of the first solvent and the second solvent (first solvent:second solvent) is 1:3 to 3:1, preferably 1:2 to 2:1, more preferably 1:1.5 to 1.5:1, and particularly preferably substantially 1:1.

By setting the mixing volume ratio of the first solvent and the second solvent as described hereinabove, it is possible to reduce the aggregation of the electrode active material particles and form secondary particles (associations) of the electrode active material of a comparatively small diameter.

In other words, by adjusting the mixing volume ratio of the first solvent and the second solvent, it is possible to adjust the diameter and size of electrode active material particles provided with the carbon coating film (aggregates of the primary particles, that is, secondary particles) obtained after the calcination.

Further, in a preferred embodiment of the manufacturing method disclosed herein, the mixed material is heated to a temperature range in which the solvent of the mixed material (that is, a mixed medium of the first solvent and the second solvent) boils and subjected to reflux processing after the abovementioned two source materials have been mixed and before the below-described calcination treatment is performed with the object of further improving the dispersed state of the particulate electrode active material in the abovementioned mixed material.

For example, when the first solvent is water and the second solvent is ethanol (or other lower alcohol) which is a nonaqueous solvent compatible with water, it is preferred that the reflux processing be performed for an appropriate time, typically for about 1 h to 24 h (for example, 8 h to 12 h) in a temperature range (typically, 80 to 100° C., for example, about 90±5° C.) that exceeds about 73° C., which is a boiling temperature of ethanol and water. The reflux processing is by itself a well-known technique and since no special processing is required to carry out the present invention, further detailed explanation thereof is herein omitted.

In yet another preferred embodiment of the manufacturing method disclosed herein, the mixed material before the calcination is added to a third solvent that is a solvent different from the second solvent, that allows the particulate electrode active material to be dispersed therein and that is a poor solvent with respect to the carbon source in order to inhibit more reliably the excessive aggregation of the electrode active material particles and obtain the associations (that is, the associations that serve as a base for forming secondary particles formed of the electrode active material provided with the carbon coating film) of the electrode active material particles and carbon source of even smaller particle size.

Figure 7:
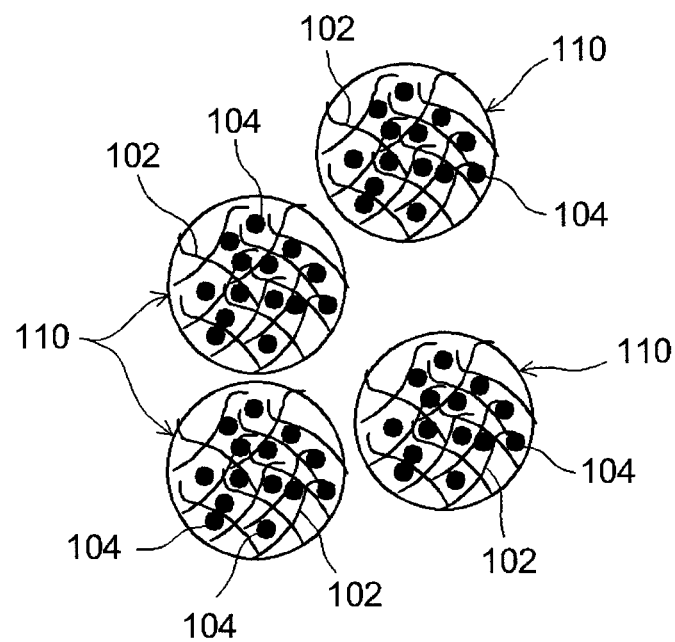
FIG. 7 is an explanatory drawing illustrating schematically the state of associations present in the third solvent obtained by the manufacturing method according to the preferred embodiment disclosed herein.

By performing such an addition of the mixed material to the third solvent (typically, the mixed material is dropwise added to the third solvent), it is possible to form the associations 110 of a comparatively small size that are formed of the carbon source 102 and the particulate electrode active material 104, such as shown in FIG. 7. Thus, when the abovementioned mixed material is added to the third solvent, the carbon source 102 present in the mixed material does not dissolve in the third solvent and therefore the mixture of the particulate electrode active material 104 and the carbon source 102 added to the third solvent (typically, the electrode active material particles with the carbon source adhered or bonded to the surface thereof) forms the associations 110 of a predetermined size in the third solvent. Typically, the associations, precipitate in the solvent.

For attaining such an object, it is more preferred that the third solvent be used in an amount equal to or greater than the volume of the mixed material added thereto. For example, it is preferred that the third solvent be used in an amount that is greater than the volume of the mixed material by a factor equal to or higher than 1, in particular equal to or higher than 1.5 (furthermore, equal to or higher than 2), but those numbers are not particularly limiting.

Further, in the manufacturing method of the present embodiment, secondary particles formed of the electrode active material provided with the carbon coating film and having the appropriate size can be produced by recovering the aforementioned associations from the third solvent (for example, by filtration or centrifugal separation) and calcining the recovered associations (mixture of the electrode active material particles and the carbon source). In other words, with the manufacturing method of the present embodiment, the size (particle diameter) of the secondary particles formed of the electrode active material provided with the carbon coating film, which has been calcined, can be regulated according to the size of the association that are formed. Furthermore, secondary particles with a small particle size distribution (preferably, of a substantially uniform particle diameter) can be manufactured.

Various solvents can be used as the third solvent, provided that the abovementioned conditions are satisfied. For example, when the abovementioned first solvent is a water-soluble solvent (typically, water) and the aforementioned carbon source is a water-soluble compound (for example, PVA), it is preferred that an organic solvent that is compatible with the aqueous solvent and is unlikely to dissolve the water-soluble compound be used as the third solvent (poor solvent). For example, an aprotic polar solvent (for example, acetone or acetonitrile) that is unlikely to dissolve the water-soluble compound) can be advantageously used.

According to the manufacturing method disclosed herein, the mixture configured by the interaction of the electrode active material and carbon source contained in the mixed material prepared in the above-described manner (that is, when the abovementioned reflux processing is performed, the mixed material after the reflux processing, and when the mixed material is further added to the abovementioned third solvent, the mixed material (associations) after the recovery from the solvent; same hereinbelow), typically, the mixture configured by adhesion or bonding of the carbon source to the surface of the electrode active material particles, is calcined. As a result, it is possible to form a conductive carbon coating film derived from the carbon source (typically, an organic substance such as PVA) on the surface of the electrode active material.

The calcining conditions are not particularly limited provided that the carbon source which is used can be thermally decomposed and the surface of the particulate electrode active material can be coated with the thermal decomposition product. When a metal oxide such as silica oxide represented by the abovementioned general formula $SiO_x$ is used as the electrode active material (in this case, the negative electrode active material), from the standpoint of preventing the calcining treatment from affecting the structure or composition of the electrode active material, it is preferred that the calcination be conducted in the inert gas atmosphere such as argon gas and nitrogen gas. Further, the calcination may be conducted at any temperature, provided that the carbon source that is used can be thermally decomposed. The calcination is typically performed for about 3 to 12 h (for example, 5 to 8 h) at a temperature equal to or higher than 800° C. (for example, 800 to 1200° C., for example, 900 to 1000° C.). As a result, a carbon coating film can be advantageously formed on the surface of the particulate electrode active material (primary particles). The material to be calcined is preferably subjected to pre-calcination for an appropriate time (typically, for 12 or fewer hours, for example, for about 1 to 6 h) before the temperature is raised to the above-mentioned maximum temperature. It is preferred that the pre-calcination be performed in a temperature range typically of 100 to 600° C., for example, of 200° C. to 300° C., but this range is not particularly limiting. By performing such a pre-calcination, it is possible to eliminate excessive reactive groups (for example, hydroxyl groups of PVA), for example, of the carbon source. Further, the effective sintered body can be obtained.

The particulate electrode active material provided with the carbon coating film that is manufactured by the manufacturing method disclosed herein can be advantageously used, similarly to the conventional electrode active material, as an active material for a positive electrode or negative electrode of a battery. Secondary batteries of various types can be constructed by using the conventional materials and processes in addition to the feature of using such an electrode active material. For example, a lithium secondary battery can be constructed by using a metal oxide such as silicon oxide represented by the abovementioned general formula $SiO_x$ that is provided with the carbon coating film and manufactured by the manufacturing method disclosed herein as a negative electrode active material.

An embodiment of a lithium secondary battery provided with a negative electrode active material formed of silicon oxide represented by the general formula $SiO_x$ and manufactured by the manufacturing method disclosed herein is described below, but this embodiment is not intended to limit the utilization embodiment of the electrode active material disclosed herein.

A specific feature of the lithium secondary battery according to the present embodiment is that the abovementioned particulate electrode active material provided with the carbon coating film is used as the negative electrode active material. Therefore, the contents, properties, and compositions of other materials and members constituting the battery are not particularly restricted and the materials and members similar to those of the conventional lithium secondary battery can be used, provided that the object of the present invention can be attained.

A configuration in which a negative electrode active material layer (also referred to as a negative electrode mix layer) is formed by causing the adhesion of the particulate negative electrode active material ($SiO_x$) obtained by the manufacturing method disclosed herein together with a binder (binding material) and an optionally used conductivity enhancing material as a negative electrode mix to a negative electrode collector can be advantageously used as a negative electrode.

A rod-shaped body, a plate-shaped body, a foil-shaped body, or a mesh-shaped body constituted mainly by copper, nickel, titanium stainless steel, or the like can be used as the negative electrode collector. Examples of suitable binders include polyvinylidene fluoride (PVDF), polytetrafluoroethylene (PTFE), carboxymethyl cellulose (CMC), and styrene butadiene rubber (SBR). The conventional carbon material such as carbon black can be advantageously used as the conductivity enhancing material.

The surface of the particulate negative electrode active material (primary particles) used herein is sufficiently covered by the carbon coating film and excels in electric conductivity. Therefore, the negative electrode active material layer may include no conductivity enhancing material or a content ratio of the conductivity enhancing material therein can be reduced with respect to that in the conventional negative electrode active material layers. The amount of the conductivity enhancing material related to 100 parts by weight of the negative electrode active material used can be, for example, about 1 to 30 parts by weight (preferably about 2 to 20 parts by weight, for example, about 5 to 10 parts by weight), but it is not limited thereto. The conductivity enhancing material may be introduced in advance into the above-described electrode active material supply material.

A powdered material including the abovementioned negative electrode active material and optionally the conductivity enhancing material is dispersed together with an appropriate binder (binding material) in an appropriate dispersion medium (for example, an organic solvent such as N-methylpyrrolidone (NMP) or an aqueous solvent such as water) and kneaded to prepare a paste-like negative electrode mix (referred to hereinbelow as "negative electrode mix paste"). A negative electrode for a lithium secondary battery can be fabricated by coating the appropriate amount of the negative electrode mix paste on the negative electrode collector and then drying and pressing.

Meanwhile, a configuration in which an active material capable of reversibly absorbing and desorbing Li together with a binder and an optionally used conductive material are caused to adhere as a positive electrode mix to a collector can be advantageously used as a positive electrode.

A rod-shaped body, a plate-shaped body, a foil-shaped body, and a mesh-shaped body constituted mainly by aluminum, nickel, titanium, or stainless steel can be used as the positive electrode collector. A lithium-transition metal complex oxide having a layered structure, a lithium-transition metal complex oxide having a spinel structure, or a polyanion compound having an olivine structure, which can be used for a positive electrode of a typically lithium secondary battery, can be advantageously used as the positive electrode active material. Representative examples of such active materials include lithium-transition metal oxides such as lithium cobalt oxide ($LiCoO_2$), lithium nickel oxide ($LiNiO_2$), and lithium manganese oxide ($LiMn_2O_4$). Further, a compound represented by the following general formula: $LiMAO_4$ can be also used. In this formula, M is one, or two or more elements (typically, one, or two or more metal elements) including at least one metal element selected from the group consisting of Fe, Co, Ni, and Mn. Thus, at least one metal element selected from the group consisting of Fe, Co, Ni, and Mn is included, but the presence of minor additional elements that can be included in small amounts is also allowed (those minor additional elements may also not be present). Further, in the abovementioned formula, A is preferably one, or two or more elements selected from the group consisting of P, Si, S, and V. Specific examples include $LiFePO_4$, $LiFeSiO_4$, $LiCoPO_4$, $LiCoSiO_4$, $LiFe_{0.5}Co_{0.5}PO_4$, $LiFe_{0.5}Co_{0.5}SiO_4$, $LiMnPO_4$, $LiMnSiO_4$, $LiNiPO_4$, and $LiNiSiO_4$ as particularly preferred polyanion compounds.

The binder can be same as that used on the negative electrode side. Examples of suitable conductive materials include carbon materials such as carbon black (for example, acetylene black) and a graphite powder, or a conductive metal powder such as a nickel powder. The amount of the conductive material related to 100 parts by weight of the positive electrode active material can be, for example, 1 to 20 parts by weight (preferably, 5 to 15 parts by weight), but those ranges are not limiting. Further, the amount of the binder related to 100 parts by weight of the positive electrode active material can be, for example, 0.5 to 10 parts by weight.

A paste-like positive electrode mix (referred to hereinbelow as "positive electrode mix paste") is prepared by dispersing the powdered material including the positive electrode active material and conductivity enhancing material such as described hereinabove together with an appropriate binder in an appropriate dispersion medium and kneading, in the same manner as on the negative electrode side. A positive electrode for a lithium secondary battery can be fabricated by coating the appropriate amount of the positive electrode mix paste on the positive electrode collector and then drying and pressing.

A liquid electrolyte including a nonaqueous solvent and a lithium salt that can be dissolved in this solvent can be advantageously used as an electrolyte introduced between the positive electrode and the negative electrode. A solid (gelled) electrolyte obtained by adding a polymer to the aforementioned liquid electrolyte may be also used. Aprotic solvents such as carbonates, esters, ethers, nitriles, sulfones, and lactones can be used as the abovementioned nonaqueous solvent. For example, one, or two or more solvents selected from the nonaqueous solvents known to be typically suitable for electrolytes of lithium ion batteries can be used as the abovementioned nonaqueous solvent, specific examples of such solvents including ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyl tetrahydrofuran, dioxane, 1,3-dioxolan, diethylene glycol dimethyl ether, ethylene glycol dimethyl ether, acetonitrile, propionitrile, nitromethane, N,N-dimethylformamide, dimethylsulfoxide, sulfolan, and γ-butyrolactone.

One, or two or more salts selected from various lithium salts that are known to be capable of functioning as support electrolytes in electrolytic solution of lithium ion batteries can be used as the lithium salt, specific examples including $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$. The concentration of the lithium salt is not particularly limited and can be same, for example, as that of the electrolyte used in the conventional lithium ion batteries. Usually, a nonaqueous electrolyte including about 0.1 mol/L to 5 mol/L (for example, about 0.8 mol/L to 1.5 mol/L) support electrolyte (lithium salt) can be advantageously used.

A lithium secondary battery is constructed by accommodating the abovementioned positive electrode and negative electrode together with the electrolyte in an appropriate case (a housing made from a metal or a resin, a bag made from a laminated film, and the like). In a representative configuration of the lithium secondary battery disclosed herein, a separator is introduced between the positive electrode and negative electrode. A separator similar to those used in typical lithium secondary batteries can be used, and no particular limitation is placed thereon. For example, a porous sheet or a nonwoven fabric made of a resin such as polyethylene (PE), polypropylene (PP), polyesters, cellulose, and polyamides can be used. A lithium secondary battery using a solid electrolyte may be configured such that the electrolyte also functions as a separator. The shape (outer shape of the case) of the lithium secondary battery is not particularly limited, and the battery may have, for example, a cylindrical shape, an angular shape, or a coin shape.

A more specific embodiment of the lithium secondary battery using the negative electrode active material manufactured by the manufacturing method disclosed herein is explained below by way of examples of a lithium secondary battery provided with a wound electrode body and a battery pack for a vehicle that is constructed by using such a battery as a constituent part (unit cell), but the present invention is not intended to be limited by this embodiment.

In the figures described hereinbelow, members or parts demonstrating same operations are assigned with same reference numerals and the redundant explanation thereof is omitted or simplified. Further, the dimensional relationships (length, width, thickness, and the like) in the figures do not reflect the actual dimensional relationships.

Similarly to unit cells provided in the conventional battery packs, a unit cell 12 used as a constituent element of a battery pack 10 according to the present embodiment is typically provided, as shown in FIG. 1, with an electrode body having predetermined battery constituent materials (positive electrode active material, negative electrode active material, positive electrode collector, negative electrode collector, separator, and the like) and a case accommodating the electrode body and an appropriate electrolyte.

The battery pack 10 disclosed herein is provided with a predetermined number (typically 10 or more, preferably about 10 to 30, for example, 20) cylindrical unit cells 12. The unit cell 12 is provided with a case 14 of a shape (in the present embodiment, a flat box-like shape) that can accommodate the below-described flat-shaped wound electrode body. There can be a spread in dimensions (for example, the external shape such as the thickness in the stacking direction) of parts of the unit cells 12 that is caused by dimensional errors during the manufacture of the cases 14.

The case 14 is provided with a positive electrode terminal 15 for electric connection to the positive electrode of the wound electrode body and a negative electrode terminal 16 for electric connection to the negative electrode of the electrode body. As shown in the figure, the positive electrode terminal 15 of one unit cell and the negative electrode terminal 16 of the other unit cell, among the adjacent unit cells 12, are electrically connected by a connection jig 17. The battery pack 10 designed for a desired voltage is thus constructed by connecting the unit cells 12 in series as described hereinabove.

A safety valve 13 or the like for releasing the gas generated inside the case can be provided in the case 14 in the same manner as in the conventional unit cell case. The configuration of the case 14 itself does not characterize the present invention and therefore the detailed explanation thereof is herein omitted.

The material of the case 14 is not particularly limited, provided that it is similar to that used in the conventional unit cells. For example, a case made from a metal (for example, aluminum and steel) and a case made from a synthetic resin (for example, high-melting resins, e.g., a polyolefin resin such as polypropylene, polyethylene terephthalate, polytetrafluoroethylene, and polyamide resins) can be advantageously used. The case 14 according to the present embodiment is made, for example, from aluminum.

Figure 2:
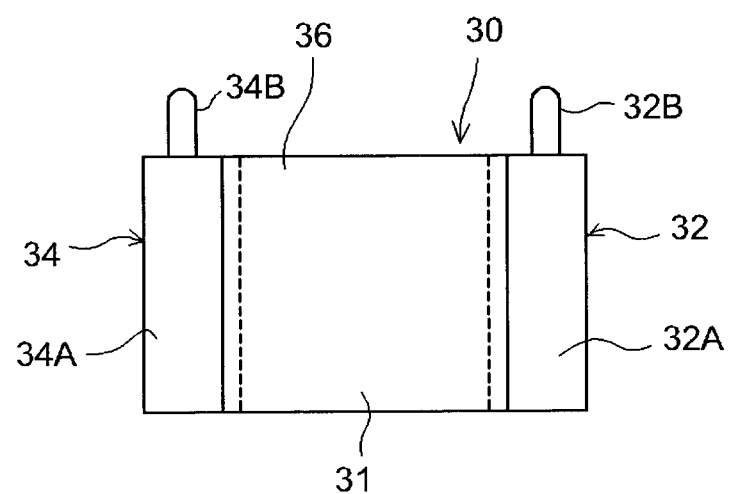
FIG. 2 is a front view illustrating schematically an example of a wound electrode body.
Figure 3:
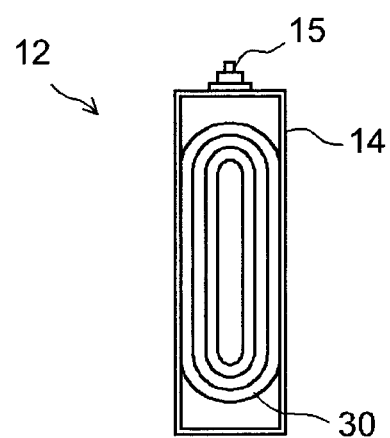
FIG. 3 is a cross-sectional view illustrating schematically the configuration of a unit battery provided in the battery assembly.

As shown in FIG. 2 and FIG. 3, similarly to the wound electrode body of the usual lithium ion battery, the unit cell 12 is provided with a flat-shaped wound electrode body 30 produced by laminating a sheet-shaped positive electrode 32 (also referred to hereinbelow as "positive electrode sheet 32"), a sheet-shaped negative electrode 34 (also referred to hereinbelow as "negative electrode sheet 34") with a total of two sheet-shaped separators 36 (referred to hereinbelow as "separator sheet 36"), winding the positive electrode sheet 32 and the negative electrode sheet 34 with a certain displacement, and then expanding the obtained wound body by pressurization from the side surface direction.

As shown in FIG. 2 and FIG. 3, the winding is performed with a certain displacement, as mentioned hereinabove, in the direction crossing the winding direction of the wound electrode body 30. As a result, end portions of the positive electrode sheet 32 and the negative electrode sheet 34 protrude to the outside from the respective wound core portions 31 (that is, a portion where the positive electrode active material layer formation portion of the positive electrode sheet 32, the negative electrode active material layer formation portion of the negative electrode sheet 34, and the separator sheet 36 are tightly wound together). A positive electrode lead terminal 32B and a negative electrode lead terminal 34B are attached to the protruding portion 32A on the positive electrode side (that is, the non-formation portion of the positive electrode active material layer) and the protruding portion 34A on the negative electrode side (that is, the non-formation portion of the negative electrode active material layer), respectively, and those lead terminals 32B, 34B are electrically connected to the above-described positive electrode terminal 15 and negative electrode terminal 16, respectively.

The materials constituting the wound electrode body 30 of the above-described configuration and the members themselves are not particularly limited and may be same as those of the electrode body of the conventional lithium ion battery, except that the negative electrode active material (for example, represented by the abovementioned general formula $SiO_x$) provided with a carbon coating film and obtained by the manufacturing method disclosed herein is used.

The positive electrode sheet 32 is formed by attaching the positive electrode active material layer for a lithium secondary battery to an elongated positive electrode collector (for example, an elongated aluminum foil). In the present embodiment, a sheet-shaped positive electrode collector having a shape that can be advantageously used in the lithium secondary battery (unit cell) 12 provided with the wound electrode body 30 is used. For example, the positive electrode active material layer is formed by using an aluminum foil with a length of about 2 m to 4 m (for example, 2.7 m), a width of about 8 cm to 12 cm (for example, 10 cm), and a thickness of about 5 μm to 30 μm (for example, 10 μm to 20 μm) as the collector and coating the positive electrode mix paste that has been prepared in advance on the surface of the collector. The abovementioned paste can be advantageously applied to the surface of the positive electrode collector by using an appropriate application device such as a gravure coater, a slit coater, a die coater, or a comma coater.

After the paste has been coated, the solvent (typically, water) contained in the paste is dried and compressed (pressurized) to form a positive electrode active material layer. The conventional well-known compression method such as a roll pressing method and a plate pressing method can be used as the compression method. When the thickness of the positive electrode active material layer is adjusted, the thickness may be measured with a film thickness meter and the compression may be performed a plurality of times by adjusting the pressing pressure to obtain the desired thickness.

Meanwhile, the negative electrode sheet 34 can be formed by attaching the negative electrode active material layer for a lithium secondary battery to an elongated negative electrode collector. A conductive member made of a metal with good electric conductivity, for example copper, can be used as the negative electrode collector. In the present embodiment, a sheet-shaped negative electrode collector having a shape that can be advantageously used in the lithium secondary battery (unit cell) 12 provided with the wound electrode body 30 is used. For example, the negative electrode sheet can be advantageously produced by using a copper foil with a length of about 2 m to 4 m (for example, 2.9 m), a width of about 8 cm to 12 cm (for example, 10 cm), and a thickness of about 5 μm to 30 μm (for example, 10 μm to 20 μm) as the negative electrode collector, applying a negative electrode mix paste (for example, including negative electrode active material 80 to 90 wt %, conductivity enhancing material 3 to 15 wt %, binder 3 to 10 wt %) prepared by adding the negative electrode active material and the binding material to an appropriate solvent (water, an organic solvent, or mixed solvents thereof) and dispersing or dissolving to the surface of the negative electrode collector, drying, and compressing.

Further, a sheet formed of a porous polyolefin resin is an example of the separator sheet 36 that can be advantageously used between the positive and negative electrode sheets 32, 34. For example, a porous separator sheet made from a synthetic resin (for example, from a polyolefin such as polyethylene) that has a length of about 2 m to 4 m (for example, 3.1 m), a width of about 8 cm to 12 cm (for example, 11 cm), and a thickness of about 5 μm to 30 μm (for example, 25 μm) can be advantageously used.

In the case of a lithium secondary battery using a solid electrolyte or a gelled electrolyte as the electrode (the so-called lithium ion polymer battery), the separator is sometimes not required (thus, in this case, the electrolyte itself can function as the separator).

The unit cell 12 is constructed by accommodating the obtained flat-shape wound electrode body 30 inside the case 14 so that the winding axis is oriented sideways as shown in FIG. 3, pouring a nonaqueous electrolyte (electrolytic solution) such as a mixed solvent of diethyl carbonate (DEC) and ethylene carbonate (EC) (the DEC:EC volume ratio can be within a range of 1:9 to 9:1) including an appropriate amount (for example, concentration 1 M) of an appropriate support salt (for example, a lithium salt such as $LiPF_6$) into the case, and sealing.

As shown in FIG. 1, a plurality of unit cells 12 of the same shape that have been constructed in the above-described manner are arranged so that the wide surfaces of the cases 14 (that is, the surfaces facing the flat surfaces of the below-described wound electrode bodies 30 accommodated inside the cases 14) face each other, while every other unit cell is being reversed so that the positive electrode terminals 15 and the negative electrode terminals 16 thereof are arranged alternately. Cooling plates 11 of a predetermined shape are disposed so as to be in intimate contact with wide surfaces of the cases 14 between the arranged unit cells 12 and on both outer sides in the unit cell arrangement direction (stacking direction). The cooling plates 11 function as heat dissipating members for efficiently dissipating the heat generated inside the unit cells when the unit cells are used. It is preferred that the cooling plates have a frame-like shape such that a cooling fluid (typically air) could be introduced between the unit cells 12. Alternatively, cooling plates 11 made from a metal with good thermal conductivity or from lightweight and hard polypropylene or other synthetic resin can be advantageously used.

A pair of end plates 18, 19 is disposed further on the outside of the cooling plates 11 arranged on both outer sides of the unit cells 12 and the cooling plates 11 arranged in the above-described manner (the combination thereof will be referred to hereinbelow as "unit cell group"). One or a plurality of sheet-shaped spacer members 40 serving as length adjusting means may be inserted between the cooling plate 11 disposed on one outer side (right side in FIG. 2) of the abovementioned unit cell group and the end plate 18. The material constituting the spacer member 40 is not particularly limited, and a variety of materials (metal materials, resin materials, ceramic materials, and the like) can be used, provided that the below-described length adjusting function can be demonstrated. From the standpoint of durability against shocks, it is preferred that a metal material or a resin material be used. For example, the spacer member 40 made from a lightweight polyolefin resin can be advantageously used.

Further, the entire body including the unit cell group in which the unit cells 12 are thus arranged in the stacking direction, the spacer member 40, and the end plates 18, 19 is then restrained by a predetermined restraining pressure P in the stacking direction by using a restraining band 21 for fastening that is attached so as to span between the two end plates 18, 19. More specifically, as shown in FIG. 1, the end portions of the restraining band 21 are fastened and fixed to the end plate 18 by screws 22, thereby restraining the unit cell group so that a predetermined restraining pressure P (for example, the surface pressure received by the wall surface of the cases 14 is about 0.1 MPa to 10 MPa) is applied in the unit cell arrangement direction. In the battery pack 10 restrained by such a restraining pressure P, the restraining pressure is also applied to the wound electrode body 30 located inside the case 14 of each unit cell 12, and the gas generated inside the cases 14 can be prevented from accumulating inside the wound electrode body 30 (for example, between the positive electrode sheet 32 and the negative electrode sheet 34) and degrading the battery performance.

In several specific examples, the lithium secondary batteries (sample batteries) were constructed by using the negative electrodes provided with the particulate negative electrode active material (silicon oxide) manufactured by the manufacturing method disclosed herein, and the performance of the sample batteries was evaluated.

<Performance Evaluation Test 1>
(Preparation of Sample 1-1)

A carbon source supply material was prepared by adding 12 g of polyvinyl alcohol (PVA) as a carbon source to 225 mL of deionized water as the first solvent, and stirring for 1 h by using a stirrer under ultrasound irradiation.

Then, commercial silicon monoxide (SiO: manufactured by Sigma-Aldrich Co.) and a carbon black (CB) powder were placed into a planetary ball mill to obtain a mass ratio of SiO:CB=10:1, and a grinding-mixing processing was performed for 3 h at 250 rpm.

The powdered material including silicon monoxide and having an average particle size (median diameter based on a light scattering method: d50) of about 400 nm that was obtained by the abovementioned ball mill processing was weighted to obtain a silicon monoxide weight of 12 g and added to 75 mL of ethanol. An electrode active material supply material in a state with dispersed silicon monoxide was then prepared by stirring for 1 h by using a stirrer under ultrasound irradiation.

The abovementioned prepared electrode active material supply material (second solvent: ethanol) was then added to the prepared carbon source supply material (first solvent; deionized water), while stirring with a stirrer under ultrasound irradiation.

The obtained mixed material, that is, the mixed material including SiO and PVA by 12 g each and formed of a mixed solvent of 225 mL of deionized water and 75 mL of ethanol (volume ratio of water:ethanol=3:1) was then subjected to a reflux processing for 12 h at a temperature of 90° C. As a result, a mixed material of sample 1-1 was obtained. Part of the mixed material was sampled, and the average particle size of SiO was calculated on the basis of optical microscopic observations. The results are shown in the appropriate column of Table 1.

(Preparation of Sample 1-2)

A carbon source supply material was prepared by adding 12 g of PVA to 150 mL of deionized water and stirring for 1 h by using a stirrer under ultrasound irradiation.

The powdered material including silicon monoxide that was obtained by the abovementioned ball mill processing was weighted to obtain a silicon monoxide weight of 12 g and added to 150 mL of ethanol. An electrode active material supply material was then prepared by stirring for 1 h by using a stirrer under ultrasound irradiation.

A mixed material of sample 1-2 (that is, a mixed material including SiO and PVA by 12 g each and formed of a mixed solvent of 150 mL of deionized water and 150 mL of ethanol (volume ratio of water:ethanol=1:1)) was obtained by the same procedure as that used for the preparation of sample 1-1. Part of the mixed material was sampled, and the average particle size of SiO was calculated in the same manner as that of sample 1-1. The results are shown in the appropriate column of Table 1.

(Preparation of Sample 1-3)

A carbon source supply material was prepared by adding 12 g of PVA to 75 mL of deionized water and stirring for 1 h by using a stirrer under ultrasound irradiation.

The powdered material including silicon monoxide that was obtained by the abovementioned ball mill processing was weighted to obtain a silicon monoxide weight of 12 g and added to 225 mL of ethanol. An electrode active material supply material was then prepared by stirring for 1 h by using a stirrer under ultrasound irradiation.

A mixed material of sample 1-3 (that is, a mixed material including SiO and PVA by 12 g each and formed of a mixed solvent of 75 mL of deionized water and 225 mL of ethanol (volume ratio of water:ethanol=1:3)) was obtained by the same procedure as that used for the preparation of sample 1-1. Part of the mixed material was sampled, and the average particle size of SiO was calculated in the same manner as that of sample 1-1. The results are shown in the appropriate column of Table 1.

(Preparation of Sample 1-4)

A carbon source supply material was prepared by adding 12 g of PVA to 300 mL of deionized water and stirring for 1 h by using a stirrer under ultrasound irradiation.

The powdered material including silicon monoxide that was obtained by the abovementioned ball mill processing was weighted to obtain a silicon monoxide weight of 12 g and added to the carbon source supply material. Then, stirring was conducted for 1 h by using a stirrer under ultrasound irradiation.

A mixed material of sample 1-4 (that is, a mixed material in which SiO and PVA are mixed by 12 g each in 300 mL of deionized water) was obtained by the same procedure as that used for the preparation of sample 1-1. Part of the mixed material was sampled, and the average particle size of SiO was calculated in the same manner as that of sample 1-1. The results are shown in the appropriate column of Table 1.

(Preparation of Sample 1-5)

The powdered material including silicon monoxide that was obtained by the abovementioned ball mill processing was weighted to obtain a silicon monoxide weight of 12 g and added to 300 mL of ethanol. An electrode active material supply material was then prepared by stirring for 1 h by using a stirrer under ultrasound irradiation.

A total of 12 g of PVA was then added to the abovementioned electrode active material supply material. Then, stirring was conducted for 1 h by using a stirrer under ultrasound irradiation.

A mixed material of sample 1-5 (that is, a mixed material in which SiO and PVA are mixed by 12 g each in 300 mL of ethanol) was obtained by the same procedure as that used for the preparation of sample 1-1. In this mixed material, the PVA was not dissolved and remained precipitated. Therefore, the average particle size was not calculated.

TABLE 1

| Sample No. | Solvent ratio (vol.) $H_2O$:EtOH | Mixing ratio (mass) PVA:SiO | Average particle size (μm) |
|---|---|---|---|
| 1-1 | 3:1 | 1:1 | 2.27 |
| 1-2 | 1:1 | 1:1 | 1.64 |
| 1-3 | 1:3 | 1:1 | 2.52 |
| 1-4 | 1:0 | 1:1 | 2.27 |
| 1-5 | 0:1 | 1:1 | — |

The results relating to the average particle size of SiO that are shown in Table 1 clearly indicate that an especially good dispersivity of SiO was obtained in the mixed material of sample 1-2. Thus, it was confirmed that the aggregation of electrode active material particles with each other can be reduced by obtaining a mixing ratio (EtOH:$H_2O$) of the content ratio of ethanol (poor solvent), which is the second solvent, to that of water, which is the first solvent, of about 1:2 to 2:1 (more preferably, 1:1.5 to 1.5:1; in this case, generally 1:1). When the mixing ratio of water was high (for example, sample 1-1 or sample 1-4), the dispersivity of SiO decreased. Conversely, where the mixing ratio of the poor solvent such as ethanol was high (for example, sample 1-3 or sample 1-5), the PVA was hardly dissolved and tended to precipitate in the solution, and the dispersivity of SiO also decreased.

(Construction of Evaluation Cells and Evaluation of Electrochemical Characteristics)

Evaluation cells were fabricated by using the abovementioned samples 1-1 to 1-5. Specifically as follows.

Thus, the mixed materials (samples) were dried by using a rotary evaporator, and the obtained mixture of the carbon source and SiO was then calcined. As for the calcination conditions, the maximum calcination temperature was set to about 1000° C. in an argon gas atmosphere and the calcination was performed for about 6 h at this temperature. After the samples had been subjected to pre-calcination in advance for about 1 to 5 h within a temperature range of 200° C. to 300° C., the temperature was raised to the maximum calcination temperature. As a result, the unnecessary hydroxyl groups of PVA could be eliminated.

Electrode active materials for testing were obtained by grinding the obtained calcined samples and classifying with a 100-mesh sieve. Test electrodes were fabricated by using the obtained 100-mesh-under electrode active materials. Thus, the active material, a graphite powder with an average particle size of 13 μm, and PVDF were mixed with N-methyl pyrrolidone to obtain a mixing ratio thereof of 85:10:5 and a slurry composition (paste) was thus prepared. The paste was coated on a copper foil (manufactured by Nippon Seibaku Co.) with a thickness of 10 μm and dried, thereby forming an active material layer with a thickness of 25 μm on one side of the copper foil. Then, a test electrode was then fabricated by pressing to obtain the electrode density of 1.2 mg/cm$^2$ of the entire body including the copper foil and the active material layer, and then punching to obtain a circle with a diameter of 16 mm.

A metallic lithium foil with a diameter of 15 mm and a thickness of 0.15 mm was used as a counter electrode. A porous polyolefin sheet with a diameter of 22 mm and a thickness of 0.02 mm was used as a separator. A solution prepared by dissolving $LiPF_6$ as a lithium salt to a concentration of about 1 mol/L in a mixed solvent including ethylene carbonate (EC) and diethyl carbonate (DEC) at a volume ratio of 3:7 was used as an electrolytic solution.

The aforementioned constituent elements were introduced in a stainless steel case, thereby constructing an evaluation coin cell of a typical shape with a thickness of 2 mm and a diameter of 32 mm (the so-called 2032 type).

The operation of causing the absorption of Li into the test electrode to obtain an inter-electrode voltage of 0.01 V at a constant current of 0.2 C (a current value obtained by multiplying 1 C, that is, the current value enabling full charging within 1 h, by 0.2) and the operation of causing the desorption of Li to obtain an inter-electrode voltage of 1.2 V at a constant current of 0.2 C were repeated a total of 50 times with respect to the coin cells fabricated by using each of the abovementioned samples (that is, for each electrode active material corresponding to each sample). The ratio of the Li desorption capacitance (discharge capacitance) in the 50th cycle to the Li absorption capacitance (discharge capacitance) in the 1st cycle was measured as a capacitance retention ratio (%).

More specifically, the capacitance retention ratio was determined by the following formula: (Li desorption capacitance in the 50th cycle)/(Li absorption capacitance in the 1st cycle)×100. The results are shown in Table 2.

As follows from Table 2, the evaluation cells using the electrode active materials of samples 1-1 to 1-3 manufactured by the manufacturing method disclosed herein (actually, lithium secondary batteries using the electrode active materials as negative electrode active materials) could realize a high capacitance retention ratio. In particular, a high capacitance retention ratio was obtained in the evaluation cell using the electrode active material of sample 1-2 that was prepared by making a mixing ratio ($EtOH:H_2O$) of the content ratio of ethanol (poor solvent), which is the second solvent, to that of water, which is the first solvent, of about 1:2 to 2:1 (more preferably, 1:1.5 to 1.5:1; in this case, generally 1:1).

TABLE 2

| Sample No. | Solvent ratio (vol.) $H_2O:EtOH$ | Mixing ratio (mass) PVA:SiO | Capacitance retention ratio (%) |
|---|---|---|---|
| 1-1 | 3:1 | 1:1 | 53.0 |
| 1-2 | 1:1 | 1:1 | 85.9 |
| 1-3 | 1:3 | 1:1 | 43.4 |
| 1-4 | 1:0 | 1:1 | 1.5 |
| 1-5 | 0:1 | 1:1 | 2.4 |

<Performance Evaluation Test: 2>
(Preparation of Sample 2-1)

A carbon source supply material was prepared by adding 0.5 g of polyvinyl alcohol (PVA) as a carbon source to 150 mL of deionized water as the first solvent, and stirring for 1 h by using a stirrer under ultrasound irradiation.

Then, commercial silicon monoxide (SiO: manufactured by Sigma-Aldrich Co.) and a carbon black (CB) powder were placed into a planetary ball mill to obtain a mass ratio of SiO:CB=10:1, and a grinding-mixing processing was performed for 3 h at 250 rpm.

The powdered material including silicon monoxide and having an average particle size (median diameter based on a light scattering method: d50) of about 400 nm that was obtained by the abovementioned ball mill processing was weighted to obtain a silicon monoxide weight of 5 g and added to 150 mL of ethanol. An electrode active material supply material in a state with dispersed silicon monoxide was then prepared by stirring for 1 h by using a stirrer under ultrasound irradiation.

The abovementioned prepared electrode active material supply material (second solvent: ethanol) was then added to the prepared carbon source supply material (first solvent; deionized water), while stirring with a stirrer under ultrasound irradiation.

The obtained mixed material, that is, the mixed material including 5 g of SiO and 0.5 g PVA and formed of a mixed solvent of 150 mL of deionized water and 150 mL of ethanol (volume ratio of water:ethanol=1:1) was then subjected to a reflux processing for 12 h at a temperature of 90° C. As a result, a mixed material of sample 2-1 was obtained. In order to study the dispersion state of SiO in the mixed material, part of the mixed material was sampled, observations under an electron microscope (SEM) were performed and the distance between SiO particles that are close to each other was visually confirmed. The results are shown in the appropriate column of Table 3.

(Preparation of Sample 2-2)

A carbon source supply material was prepared by adding 0.5 g of PVA to 150 mL and stirring for 1 h by using a stirrer under ultrasound irradiation.

The powdered material including silicon monoxide that was obtained by the abovementioned ball mill processing was weighted to obtain a silicon monoxide weight of 5 g and added to 150 mL of deionized water. An electrode active material supply material was then prepared by stirring for 1 h by using a stirrer under ultrasound irradiation.

A mixed material of sample 2-2, that is, a mixed material including 5 g of SiO and 0.5 g of PVA and formed of a solvent of 300 mL of deionized water was obtained by the same procedure as that used for the preparation of sample 2-1. Part of the mixed material was sampled, SEM observations were performed in the same manner as in the case of sample 2-1.

The results are shown in the appropriate column of Table 3.

TABLE 3

| Sample No. | Solvent ratio (vol.) $H_2O:EtOH$ | Mixing ratio (mass) Carbon source:SiO | Distance between closely located SiO (nm) | Capacitance retention ratio (%) |
|---|---|---|---|---|
| 2-1 | 1:1 | 1:10 | 10 | 84.3 |
| 2-2 | 1:0 | 1:10 | Contact (aggregation) | 12.5 |

As shown in FIG. 3, good dispersion of SiO particles (primary particles) is confirmed for the mixed material manufactured by the manufacturing method disclosed herein. By contrast, in the mixed material obtained by adding both the carbon source and the SiO to deionized water, the SiO particles significantly aggregated and dispersivity was a problem.

(Construction of Evaluation Cells and Evaluation of Electrochemical Characteristics)

Evaluation cells (2032-type coin cells) were constructed by using the abovementioned samples 2-1 and 2-2 in the same manner as in the above-described Performance Evaluation Test 1.

The operation of causing the absorption of Li into the test electrode to obtain an inter-electrode voltage of 0.01 V at a constant current of 0.2 C and the operation of causing the desorption of Li to obtain an inter-electrode voltage of 1.2 V at a constant current of 0.2 C were repeated a total of 20 times with respect to each of the coin cells in the same manner as in the above-described Performance Evaluation Test 1. The ratio of the Li desorption capacitance (discharge capacitance) in the 20th cycle to the Li absorption capacitance (discharge capacitance) in the 1st cycle was measured as a capacitance retention ratio (%). The result is shown in Table 3.

As follows from Table 3, the sample 2-1 manufactured by the manufacturing method disclosed herein had good dispersivity of SiO, and the evaluation cell using the electrode active material of this sample (actually, the lithium secondary batteries using the electrode active material as a negative electrode active material) could realize a high capacitance retention ratio.

<Performance Evaluation Test 3>
(Preparation of Sample 3-1)

A carbon source supply material was prepared by adding 0.5 g of polyvinyl alcohol (PVA) as a carbon source to 150 mL of deionized water as the first solvent, and stirring for 1 h by using a stirrer under ultrasound irradiation.

Then, commercial silicon monoxide (SiO: manufactured by Sigma-Aldrich Co.) and a carbon black (CB) powder were placed into a planetary ball mill to obtain a mass ratio of SiO:CB=10:1, and a grinding-mixing processing was performed for 3 h at 250 rpm.

The powdered material including silicon monoxide and having an average particle size (median diameter based on a light scattering method: d50) of about 400 nm that was obtained by the abovementioned ball mill processing was weighted to obtain a silicon monoxide weight of 5 g and added to 150 mL of ethanol. An electrode active material supply material in a state with dispersed silicon monoxide was then prepared by stirring for 1 h by using a stirrer under ultrasound irradiation.

The abovementioned prepared electrode active material supply material (second solvent: ethanol) was then added to the prepared carbon source supply material (first solvent; deionized water), while stirring with a stirrer under ultrasound irradiation.

The obtained mixed material, that is, the mixed material including 5 g of SiO and 0.5 g PVA and formed of a mixed solvent of 150 mL of deionized water and 150 mL of ethanol (volume ratio of water:ethanol=1:1) was then subjected to a reflux processing for 12 h at a temperature of 90° C.

The mixed material (about 300 mL) subjected to the reflux processing was placed into 300 mL of acetone as a third solvent. Acetone is a poor solvent with respect to PVA, and fine spherical associations including SiO and PVA were generated in acetone.

The spherical associations were recovered by using centrifugal separation. As a result, a mixed material of sample 3-1 that was formed of the associations (a mixture including SiO and PVA) was obtained.

A portion (150 mL) of the obtained sample was weighted, introduced into a tube for centrifugal separation, set into a centrifugal separator and subjected to centrifugal separation for 2 min at 2000 rpm. A layer including SiO and PVA (referred to hereinbelow as "SiO-PVA layer") was separated from inside the tube, the presence of a PVA particle layer constituted only by the excessive PVA was checked, and when the PVA particle layer was present, the thickness (nm) of this layer was measured with a digital slide calipers. The result is shown in the appropriate column of Table 4 and in FIG. 8.

(Preparation of Sample 3-2)

A mixed material of sample 3-2 formed of the associations (that is, a mixture including SiO and PVA) was obtained by the same procedure (that is, preparation of the mixed material→reflux processing→acetone treatment→centrifugal separation) as was used in the process for preparing sample 3-1, except that the carbon source supply material was prepared by adding 5 g of PVA to 150 mL of deionized water. The obtained mixed material was subjected to the same processing as sample 3-1, the presence of the PVA particle layer was checked, and when the PVA particle layer was present, the thickness (nm) of this layer was measured with a digital slide calipers. The result is shown in the appropriate column of Table 4 and in FIG. 8.

(Preparation of Sample 3-3)

A mixed material of sample 3-3 formed of the abovementioned associations (that is, a mixture including SiO and PVA) was obtained by the same procedure as was used in the process for preparing sample 3-1, except that the carbon source supply material was prepared by adding 5 g of PVA to 150 mL of deionized water and the electrode active material supply material was prepared by using the powdered material including silicon monoxide that was subjected to the ball mill processing, weighting the powdered material so as to obtain an amount of silicon monoxide of 1 g, and adding to 150 mL of ethanol. The obtained mixed material was subjected to the same processing as sample 3-1 and sample 3-2, the presence of the PVA particle layer was checked, and when the PVA particle layer was present, the thickness (nm) of this layer was measured with a digital slide calipers. The result is shown in the appropriate column of Table 4 and in FIG. 8.

(Preparation of Sample 3-4)

A mixed material of sample 3-4 formed of the abovementioned associations (that is, a mixture including SiO and PVA) was obtained by the same procedure as was used in the process for preparing sample 3-1, except that the carbon source supply material was prepared by adding 12 g of PVA to 150 mL of deionized water and the electrode active material supply material was prepared by using the powdered material including silicon monoxide that was subjected to the ball mill processing, weighting the powdered material so as to obtain an amount of silicon monoxide of 1.2 g, and adding to 150 mL of ethanol. The obtained mixed material was subjected to the same processing as that of samples 3-1 to 3-3, the presence of the PVA particle layer was checked, and when the PVA particle layer was present, the thickness (nm) of this layer was measured with a digital slide calipers. The result is shown in the appropriate column of Table 4 and in FIG. 8.

(Preparation of Sample 3-5)

A mixed material of sample 3-5 formed of the abovementioned associations (that is, a mixture including SiO and PVA) was obtained by the same procedure as was used in the process for preparing sample 3-1, except that the carbon source supply material was prepared by adding 12 g of PVA to 150 mL of deionized water and the electrode active material supply material was prepared by using the powdered material including silicon monoxide that was subjected to the ball mill processing, weighting the powdered material so as to obtain an amount of silicon monoxide of 0.8 g, and adding to 150 mL of ethanol. The obtained mixed material was subjected to the same processing as that of samples 3-1 to sample 3-4, the presence of the PVA particle layer was checked, and when the PVA particle layer was present, the thickness (nm) of this layer was measured with a digital slide calipers. The result is shown in the appropriate column of Table 4 and in FIG. 8.

(Preparation of Sample 3-6)

The carbon source supply material and electrode active material supply material similar to those used in the preparation of sample 3-1 were used, the processing preceding and including the abovementioned reflux processing was performed in the same manner as in the process for preparation sample 3-1, and then a mixture of SiO and PVA (sample 3-6) was recovered by suction filtration from the mixed material after the reflux processing. The mixture obtained was subjected to the same processing as that of samples 3-1 to sample 3-5, the presence of the PVA particle layer was checked, and when the PVA particle layer was present, the thickness (nm) of this layer was measured with a digital slide calipers. The result is shown in the appropriate column of Table 4 and in FIG. 8.

TABLE 4

| Sample No. | Solvent ratio (vol.) $H_2O$:EtOH | Mixing ratio (mass) Carbon source:SiO | PVA particle layer (mm) | Active material capacitance (mAh/g) |
|---|---|---|---|---|
| 3-1 | 1:1 | 0.1:1 | 0.00 | 920 |
| 3-2 | 1:1 | 1:1 | 0.10 | 1198 |
| 3-3 | 1:1 | 5:1 | 0.11 | 1102 |
| 3-4 | 1:1 | 10:1 | 1.41 | 898 |
| 3-5 | 1:1 | 15:1 | 1.72 | 812 |
| 3-6 | 1:1 | 1:1 | 0.00 | 401 |

(Construction of Evaluation Cells and Evaluation of Electrochemical Characteristics)

Evaluation cells (2032-type coin cells) were constructed by using the abovementioned samples 3-1 to 3-6 in the same manner as in the above-described Performance Evaluation Test 1.

The operation of causing the absorption of Li into the test electrode to obtain an inter-electrode voltage of 0.01 V at a constant current of 0.1 C and then causing the desorption of Li till a voltage of 1.2 V is obtained was performed with respect to each of the coin cells. A value obtained by dividing the Li desorption capacitance in this case by the weight of the active material was taken as the active material capacitance (mAh/g). The result is shown in Table 4 and FIG. 8.

Figure 8:
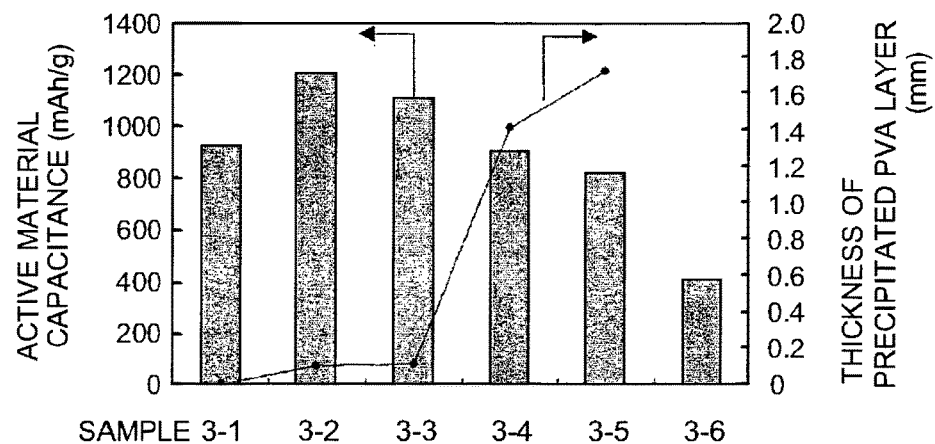
FIG. 8 shows a polygonal line graph (see the right ordinate) illustrating the thickness (mm) of a PVA particle layer in a mixed material of each sample (3-1 to 3-6) obtained in the below-described examples, and a bar graph (see the left ordinate) illustrating the active material capacitance (mAh/g) obtained by testing the evaluation cells (the counter electrode is metallic lithium) constructed by using the samples (3-1 to 3-6) as respective electrode active materials.

As shown in Table 4 and FIG. 8, all of the evaluation cells using the electrode active materials of the samples had good active material capacitance, but where the mixing ratio (PVA:SiO) of the carbon source (PVA) and electrode active material (SiO) was within a range of 0.1:1 to 10:1, the amount of present PVA particles (that is, the amount reflecting the excess amount of PVA) was also comparatively small and particularly good active material capacitance (equal to or greater than 850 mAh/g, more particularly 900 to 1200 mAh/g) was demonstrated. In particular, when the mixing ratio (PVA:SiO) was made within a range of 1:1 to 5:1, a very good active material capacitance equal to or greater than 1000 mAh/g (for example, 1100 to 1200 mAh/g) was obtained.

The present invention is explained hereinabove on the basis of the preferred embodiments thereof, but this description is not limiting, and it goes without saying that various modifications are possible.

Any of the lithium secondary batteries 12 and battery packs 10 disclosed herein excels in performance suitable for a battery to be installed on a vehicle, in particularly a high capacitance retention ratio and durability. Further, an increase in capacitance can be realized by using a metal oxide such as $SiO_x$ as an electrode active material.

Figure 4:
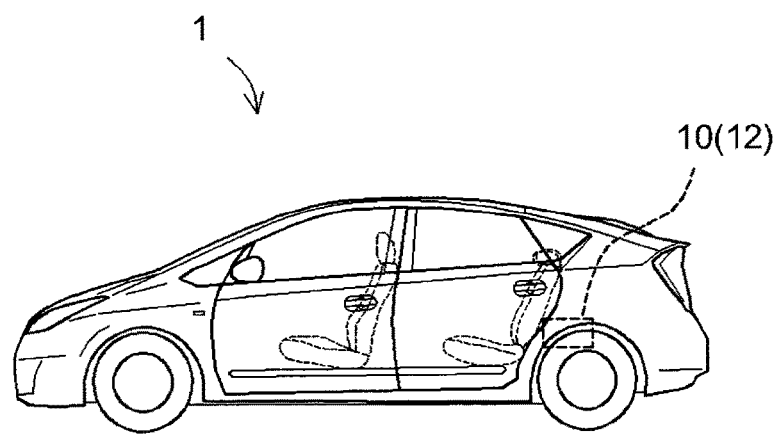
FIG. 4 is a side view illustrating schematically a vehicle equipped with a lithium secondary battery.

Therefore, in accordance with the present invention, as shown in FIG. 4, it is possible to provide a vehicle 1 provided with any of the lithium secondary batteries 12 (battery packs 10) disclosed herein. In particular, it is possible to provide a vehicle (for example, an automobile) in which the lithium secondary battery 12 serves as a power source (typically, a power source for a hybrid vehicle or an electric vehicle).

INDUSTRIAL APPLICABILITY

With the manufacturing method disclosed herein, it is possible to provide an electrode active material that excels in a capacitance retention ratio (that is, a cycle characteristic) and can realize increased capacitance. Therefore, by using such an electrode active material, it is possible to provide a secondary battery such as a lithium secondary battery with a high capacitance and good durability. Because of such features, by using the electrode active material manufactured by the manufacturing method disclosed herein, it is possible to provide a secondary battery for a vehicle (in particular, a lithium secondary battery for a vehicle) that can be used, for example, as a power source for driving the vehicle.

The invention claimed is:

1. A method for manufacturing a particulate electrode active material having a surface covered with a conductive carbon coating film, the method comprising:
    preparing a carbon source supply material prepared by dissolving a water-soluble organic compound as a carbon source for forming the carbon coating film in water as a first solvent in which the particulate electrode active material, which is the object of coating, can be dispersed, wherein the water-soluble organic compound is selected from the group consisting of polyvinyl alcohol, polyacrylic acid, polyacrylamide, polyethylene oxide, and polyethylene glycol;
    preparing an electrode active material supply material prepared by dispersing the particulate electrode active material, which is the object of coating, in a non-aqueous solvent as a second solvent that is compatible with water, that allows the particulate electrode active material to be dispersed therein, and that is a poor solvent with respect to the carbon source;
    preparing a mixed material in which the prepared carbon source supply material and electrode active material supply material are mixed;
    adding all of the mixed material to a third solvent consisting of an aprotic polar solvent that is a solvent different from the second solvent, that allows the particulate electrode active material to be dispersed therein, and that is a poor solvent with respect to the carbon source; and
    forming a conductive carbon coating film derived from the carbon source on a surface of the electrode active material by calcining a mixture of the electrode active material and the carbon source after the addition to the third solvent.

2. The manufacturing method according to claim 1, wherein the electrode active material is mainly formed of a silicon oxide represented by a general formula $SiO_x$, where x in the formula is a real number satisfying the condition $0<x<2$.

3. The manufacturing method according to claim 1, wherein the carbon source is polyvinyl alcohol, and the second solvent is a lower alcohol with a number of carbon atoms equal to or less than five.

4. The manufacturing method according to claim 1, wherein the mixed material is subjected to reflux processing before the calcining.

5. The manufacturing method according to claim 1, wherein the third solvent is acetone or acetonitrile.

6. The manufacturing method according to claim 1, wherein the mixed material is prepared by mixing the carbon source supply material and the electrode active material supply material so that the carbon source is mixed at 1 to 5 parts by weight per 1 part by weight of the particulate electrode active material.

* * * * *